US012583423B2

(12) United States Patent
Krause et al.

(10) Patent No.: US 12,583,423 B2
(45) Date of Patent: Mar. 24, 2026

(54) METHOD FOR DRIVE CONTROL

(71) Applicant: Robert Bosch GmbH, Stuttgart (DE)

(72) Inventors: Jonas Krause, Waldbach (DE); Marco Stumm, Ahrensburg (DE); Michael Erden, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 134 days.

(21) Appl. No.: 18/555,968

(22) PCT Filed: Mar. 31, 2022

(86) PCT No.: PCT/EP2022/058647
§ 371 (c)(1),
(2) Date: Oct. 18, 2023

(87) PCT Pub. No.: WO2023/285006
PCT Pub. Date: Jan. 19, 2023

(65) Prior Publication Data
US 2024/0198986 A1 Jun. 20, 2024

(30) Foreign Application Priority Data

Jul. 14, 2021 (DE) ..................... 10 2021 207 500.2

(51) Int. Cl.
*B60T 8/172* (2006.01)
*B60T 8/175* (2006.01)
*B60T 8/1761* (2006.01)

(52) U.S. Cl.
CPC .............. *B60T 8/172* (2013.01); *B60T 8/175* (2013.01); *B60T 8/17616* (2013.01)

(58) Field of Classification Search
CPC ...... B60T 8/172; B60T 8/175; B60T 8/17616; B60K 28/16; B60W 2050/0026;
(Continued)

(56) References Cited

U.S. PATENT DOCUMENTS 6,061,620 A * 5/2000 Wuerth ................. B60T 13/662
180/197
6,149,251 A * 11/2000 Wuerth ............... B60T 8/17555
303/146
(Continued)

FOREIGN PATENT DOCUMENTS

CN 102616238 A * 8/2012 ............ B60W 10/08
CN 106394561 A * 2/2017 .......... B60W 40/105
(Continued)

OTHER PUBLICATIONS

Machine Translation of CN 102616238 A PDF File Name: "CN102616238A_Machine_Translation.pdf" (Year: 2012).*
(Continued)

*Primary Examiner* — Grant Moubry
*Assistant Examiner* — Ruben Picon-Feliciano
(74) *Attorney, Agent, or Firm* — NORTON ROSE FULBRIGHT US LLP

(57) ABSTRACT

A method for the drive control of actuators of at least one wheel of a vehicle. The method includes: sensing a desired acceleration; sensing a vehicle velocity of the vehicle; sensing a wheel velocity of the wheel determining a status description of the wheel from the wheel velocity and a wheel acceleration; determining a first value of a target wheel acceleration from the status description, a slip of the wheel, and the desired acceleration; determining a second value of the target wheel acceleration from the wheel velocity, the wheel acceleration and the slip, wherein the second value is a function of correction factors of at least one matrix; and determining a third value of the target wheel acceleration, which value controls the actuators of the at least one wheel, wherein the third value is a function of the first value and of the second value.

10 Claims, 4 Drawing Sheets

(58) Field of Classification Search
CPC ..... B60W 2050/0088; B60W 2520/26; B60W 2520/28; B60W 2720/106; B60W 10/04; B60W 10/184; B60W 30/18172; B60W 40/10
See application file for complete search history.

(56) References Cited

U.S. PATENT DOCUMENTS

| | | | |
|---|---|---|---|
| 6,611,781 B1 * | 8/2003 | Gutmann | G01P 3/50 |
| | | | 702/148 |
| 8,930,104 B1 | 1/2015 | Alexander et al. | |
| 2003/0105573 A1 | 6/2003 | Ishizu et al. | |
| 2011/0022284 A1 | 1/2011 | Umakoshi et al. | |
| 2019/0263421 A1 * | 8/2019 | Zdych | B60W 40/109 |
| 2021/0053643 A1 | 2/2021 | Murphy | |

FOREIGN PATENT DOCUMENTS

| | | | | | |
|---|---|---|---|---|---|
| CN | 110095801 A | * | 8/2019 | ............... | G01B 7/12 |
| CN | 111775950 A | | 10/2020 | | |
| CN | 112660143 A | * | 4/2021 | | |
| DE | 112014002653 T5 | * | 3/2016 | ............. | B60K 28/16 |
| JP | 2008178216 A | | 7/2008 | | |
| JP | 2014015154 A | | 1/2014 | | |
| JP | 2016040968 A | | 3/2016 | | |
| JP | 2024536437 A | | 10/2024 | | |

OTHER PUBLICATIONS

Machine Translation of DE 112014002653 T5 PDF File Name:"DE112014002653T5_Machine_Translation.pdf" (Year: 2016).*
Machine Translation of CN 110095801 A PDF File Name: "CN110095801A_Machine_Translation.pdf" (Year: 2019).*
Machine Translation of CN 112660143 A PDF File Name: "CN112660143A_Machine_Translation.pdf" (Year: 2021).*
Machine Translation of CN 106394561 A PDF File Name: "CN 106394561A_Machine_Translation.pdf" (Year: 2017).*
International Search Report for PCT/EP2022/058647, Issued Aug. 3, 2022.

* cited by examiner

METHOD FOR DRIVE CONTROL

FIELD

The present invention relates to a method for the drive control of actuators of at least one wheel of a vehicle. In addition, the present invention relates to a drive control system, a vehicle, a program element, and a computer-readable medium.

BACKGROUND INFORMATION

Used in many cases for the drive control of actuators of at least one wheel of a vehicle is a multitude of subsystems, the consistent cooperation of which can only be tested and/or optimized after assembly of the subsystems. This can cause considerable effort in at least some cases. It is therefore desirable to reduce the number of subsystems for the drive control and to combine the required functions in a few, in the best case in a single drive control system.

SUMMARY

It is an object of the present invention to provide a drive control system that takes into account a multitude of relevant parameters in a consistent manner. This object may be achieved by features of the present invention. Developments of the present invention arise from the disclosure herein.

One aspect of the present invention relates to a method for the drive control of actuators of at least one wheel of a vehicle. According to an example embodiment of the present invention, the method includes the steps of:

sensing a desired acceleration;

sensing a vehicle velocity of the vehicle;

sensing a wheel velocity of the wheel;

determining a status description of the wheel from a wheel velocity and a wheel acceleration, wherein the status description comprises a static description which is a function of the wheel velocity and of the wheel acceleration;

determining a first value of a target wheel acceleration from the status description, a slip of the wheel and the desired acceleration, wherein the slip is a function of the wheel velocity and of the vehicle velocity;

determining a second value of the target wheel acceleration from the wheel velocity, the wheel acceleration and the slip, wherein the second value is a function of correction factors of at least one matrix; and determining a third value of the target wheel acceleration, which third value controls the actuators of the at least one wheel, wherein the third value is a function of the first value and of the second value.

For example, the vehicle may be a land vehicle, in particular, a passenger car, a van, a truck, a motorcycle or a land-based special-purpose vehicle. The vehicle can be a vehicle that drives in an at least partially automated manner. The vehicle can have two, three, four or more wheels. A wheel can be understood to mean a single wheel, a twin wheel, for example of a truck or of a motorcycle, and/or another type of multi-wheel. The actuators may, for example, include a powertrain and/or a brake. The powertrain can comprise an internal combustion engine and/or an electric motor. The powertrain can act on a single wheel or on several wheels, in particular on one axle. The brake can act on a single wheel or on several wheels.

The desired acceleration can, for example, be sensed by means of a so-called gas pedal, a joystick, an assistance system (e.g., cruise control, etc.), and/or by another type of sensor. The vehicle velocity $v_{GND}$ of the vehicle is the velocity of the vehicle relative to the ground. The vehicle velocity can be ascertained, for example via averaging, voting and/or by other methods, from the wheel velocities of at least two wheels by means of acceleration sensors, position determination systems, such as GPS (Global Positioning System), a combination of these methods, and/or by means of other methods. For example, the wheel velocity of the wheel can be ascertained by means of one or more sensors on the wheel and/or on an axis to which the wheel is directly connected. The wheel acceleration or the wheel dynamic is the first or the second derivative of the wheel velocity with respect to time. The wheel acceleration and/or the wheel dynamic can be calculated and/or provided directly by the one or more sensors.

According to an example embodiment of the present invention, the status description of the wheel, from the wheel velocity and the wheel acceleration, comprises a static description as a function of the wheel velocity and of the wheel acceleration. The function can comprise a logical combination of ranges of the wheel velocity and of the wheel acceleration, for example in the form "current wheel velocity greater than desired wheel velocity AND current wheel acceleration greater than desired wheel acceleration." In this case, the current wheel velocity or current wheel acceleration may have been ascertained, for example, from the wheel velocity, and the desired wheel velocity or desired wheel acceleration may have been ascertained from the desired acceleration. The status description or the function can optionally take the wheel dynamic into account.

According to an example embodiment of the present invention, the drive control can comprise determining the target wheel acceleration, i.e., the acceleration (or derived variables, such as the torque) supplied to the actuators. The target wheel acceleration can be determined in multiple stages and/or by a combination of multiple values.

According to an example embodiment of the present invention, the first value of the target wheel acceleration can comprise a qualitative value, for example a value comprising a value set {accelerate, decelerate, maintain}. The qualitative value can advantageously contribute to avoiding "rough" errors in determining the target wheel acceleration and can in this way contribute to avoiding instabilities as a result of determining the target wheel acceleration. The slip s, as a function of the wheel velocity v and the vehicle velocity $v_{GND}$, can be defined in percent and/or in m/s, for example. For example, the slip s may have been determined using a formula $s = v_{GND} - v$.

According to an example embodiment of the present invention, the second value of the target wheel acceleration can comprise a quantitative value, for example a value "plus 2 Nm," "minus 0.5 Nm." For example, the second value, as a function of correction factors of at least one matrix, may directly assume one element of the matrix, may provide it with a weighting and/or another function and/or may interpolate between two values of the matrix. The matrix can be implemented as a single matrix or as a multitude of matrices. For example, each individual wheel may comprise a respective matrix of correction factors for the powertrain and the brake, and/or for positive and negative acceleration, and/or further matrices. The second value may, for example, have been ascertained experimentally, by means of simulation (s), by experts, by a neural network, and/or by means of other methods. The second value may be unchangeable for the operational life of the vehicle, or may be changeable, e.g., on the basis of a maintenance, a tire change, a training of a neural network, and/or other events or triggers.

According to an example embodiment of the present invention, the third value of the target wheel acceleration can be a function of the first value and of the second value; in particular, the third value can be formed from the first value, the second value and/or from further values and/or information. The third value can be implemented as a single value and/or as a composite value, for example comprising a respective value for the powertrain and for the brake.

This example method according to the present invention advantageously takes into account a multitude of relevant parameters of a drive control in a consistent manner. This can improve the testing and/or optimization of the drive control in several aspects, e.g., in terms of test time, error probability, stability, ease of maintenance and/or further aspects. It is in particular advantageous that potential instabilities can thereby be reduced or even avoided from the outset. Moreover, this method can create a basis for optimizing the drive control during the operating time of the vehicle, for example through advances in simulations and/or learning machines, such as neural networks. In this case, it can in particular be advantageous that changes can only affect the matrix in many embodiments of this method.

In some embodiments of the present invention, the status description of the wheel furthermore comprises a dynamic description which is a function of the wheel acceleration and of a wheel dynamic. A dynamic description is to be understood as the description of a static actual state in combination with a defined historical time window, for example greater than 0.5 ms, greater than 1 ms, greater than 2 ms, in many cases a multiple of the computing time or cycle time. For example, possible descriptive forms for the dynamic description may include:

The status description of the wheel in the defined historical time window did not leave the currently valid state limit range, e.g., depending on the current status description ("steady in state").

The status description of the wheel in the defined historical time window has continuously exceeded state limit ranges in the positive direction and also shows a trend in the positive direction in the current status description ("state ascended & signal increasing").

The status description of the wheel in the defined historical time window has continuously exceeded state limit ranges in the positive direction but shows a trend in the opposite direction in the current status description ("state ascended & signal decreasing").

The status description of the wheel in the defined historical time window has continuously exceeded state limit ranges in the negative direction and also shows a trend in the negative direction in the current status description ("state descended & signal decreasing").

In some embodiments of the present invention, the status description of the wheel furthermore comprises a predictive description which is a function of the wheel dynamic. A wheel prediction is the description of the static actual state in combination with a defined prediction time window (future). For example, possible descriptive forms for wheel predictions or the predictive description may include:

The status description of the wheel in the defined prediction time window is likely to hit the target range with the currently acting dynamic ("TargetZone hit").

The status description of the wheel in the defined prediction time window is likely to exceed/overshoot the target range with the currently acting dynamic ("TargetZone crossed").

The status description of the wheel in the defined prediction time window will not hit the target range with the currently acting dynamic but tends to move toward the target range ("TargetZone not crossed, but high deviation in TargetZone direction").

The status description of the wheel in the defined prediction time window will not hit the target range with the currently acting dynamic and even tends to move away from the target range ("TargetZone not crossed and high deviation from TargetZone away").

In some embodiments of the present invention, the correction factors or elements of the at least one matrix are sorted by ascending slip and by ascending wheel acceleration, and the at least one matrix has a first region whose elements have a correction factor of zero. The elements of the matrix can have an equidistant distance of the slip values and/or wheel acceleration values and/or other distance functions. Correction factors "between" the elements can be interpolatable. The elements with a correction factor of zero are sometimes referred to as the target slip range. The use of such a matrix can contribute to good checkability and/or changeability of the drive control.

In some embodiments of the present invention, the third value of the target wheel acceleration is a function of a sum of the first value and of the second value. For example, the first and second values can be checked for plausibility and, depending thereon, summed. For example, if the first value is "maintain" and the second value is "plus 5 Nm," the second value can be left unconsidered or be mapped to an "alleviation function."

In some embodiments of the present invention, the third value is a function of limiting the sum of the first value and the second value. Limiting can be applied, for example, if the summed target torque is too high, e.g., too high for the powertrain or, e.g., too different from a target torque of another wheel of the axle. The limiting function can advantageously avoid inconsistencies and/or further improve the stability of the drive control.

In one embodiment of the present invention, the method comprises the further steps of:

sensing the third value for at least one situation, wherein the situation comprises the wheel velocity, the wheel acceleration and, optionally, the wheel dynamic;

comparing the third value with the corresponding correction factor of the at least one matrix; and entering the third value into the corresponding element of the at least one matrix if the slip is lower when using the third value than when using the corresponding correction factor of the at least one matrix.

These further steps can be performed, for example, during operation, or, with temporary storage, during a pause in operation and/or during maintenance. The steps can in particular use the inherent flexibility of the method, in particular of the matrix solution. These steps can advantageously contribute to continuous improvement of the drive control through the use of individual practical values of this vehicle.

One aspect of the present invention relates to a drive control system for the drive control of actuators of at least one wheel of a vehicle. According to an example embodiment of the present invention, the drive control system comprises: a signal sensing unit which is configured to sense a wheel velocity of the wheel and, optionally, to sense a wheel acceleration and/or a wheel dynamic. Furthermore, a further sensing unit which is configured to sense a desired acceleration and a vehicle velocity of the vehicle. The further sensing unit can also be referred to as a target signal sensing unit.

Furthermore, the drive control system comprises a state determination unit, which is configured to determine a status description of the wheel from a wheel velocity and a wheel acceleration, and an action determination unit, which is configured to determine a first value of a target wheel acceleration from the status description, a slip of the wheel and the desired acceleration, wherein the slip is a function of the wheel velocity and of the vehicle velocity. Furthermore, it comprises a correction unit which comprises at least one matrix which contains correction factors and which is configured to determine a second value of the target wheel acceleration. The first and second values are passed to an actuator control device which is configured to control the actuators of the at least one wheel based on an operation of the first value with the second value.

One aspect of the present invention relates to a vehicle comprising a drive control system as described above and/or below.

One aspect of the present invention relates to a program element that, when executed on a drive control system as described above and/or below, instructs the drive control system to perform the method as described above and/or below.

One aspect of the present invention relates to a computer-readable medium on which a program element as described above is stored.

Further measures improving the present invention are described in more detail below on the basis of the figures, together with the description of the preferred exemplary embodiments of the present invention.

DETAILED DESCRIPTION OF EXAMPLE EMBODIMENTS

Figure 1:
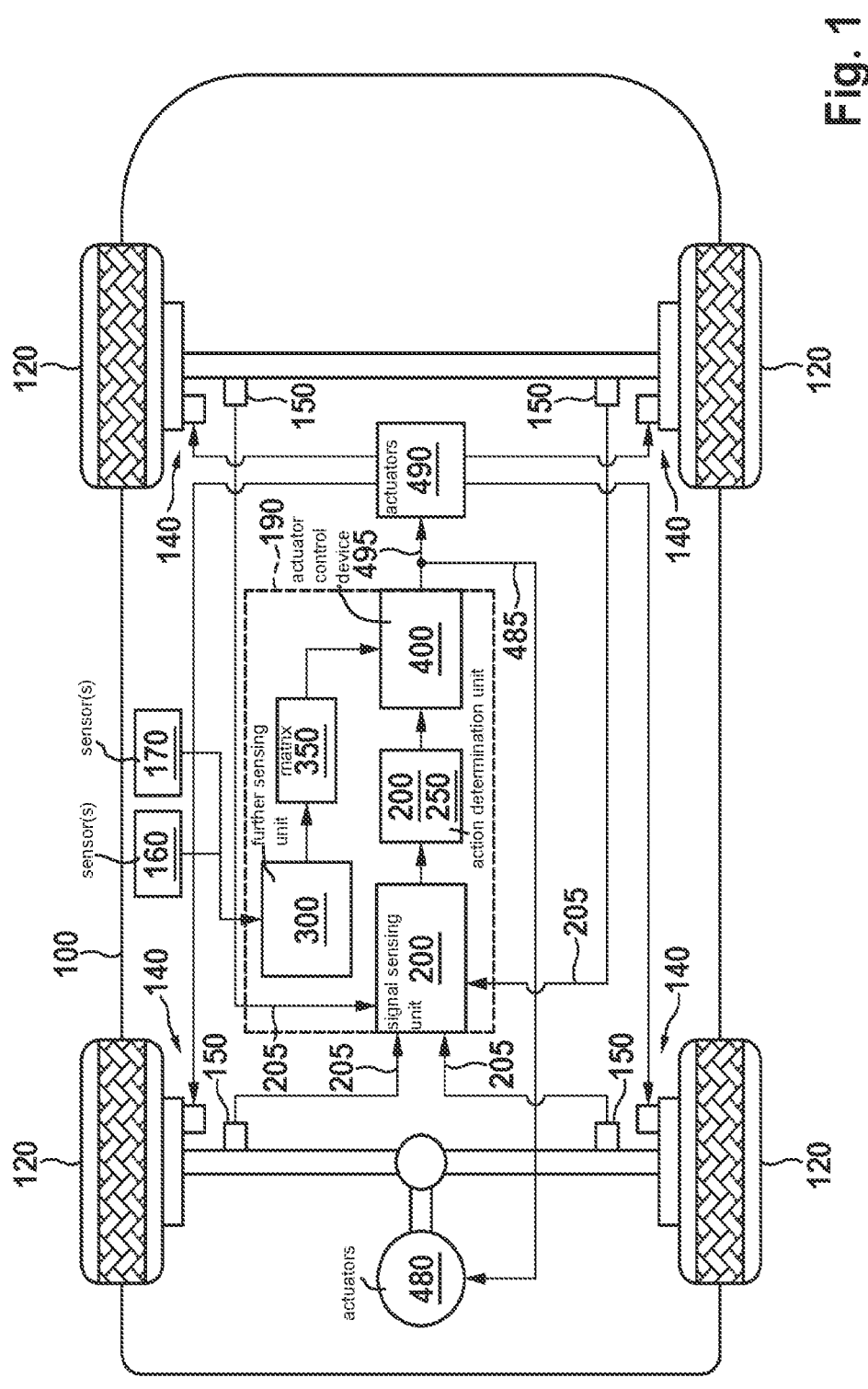
FIG. 1 shows a schematic illustration of a vehicle according to one embodiment of the present invention.

FIG. 1 shows a schematic illustration of a vehicle 100 according to one embodiment. The vehicle of the exemplary embodiment shown comprises, without restricting generality, four wheels 120 with brakes 140.

The brakes 140 are actuated by actuators 490. In one exemplary alternative embodiment, the actuators 490 can also be part of the brakes 140, for example; further embodiments are also possible. The vehicle 100 furthermore comprises actuators 480, which may be part of the powertrain, for example. The vehicle 100 furthermore comprises sensors 150 for a wheel velocity v of each wheel 120, which sensors may, for example, be arranged on the wheel 120 and/or on the axle. The sensors 150 can also provide a wheel acceleration a and/or a wheel dynamic j. Furthermore, the vehicle comprises one or more sensors 160 for a desired acceleration DrvReq, for example from a gas pedal, a joystick, an assistance system (e.g., a cruise control), and/or from further sources. In addition, the vehicle comprises one or more sensors 170 for a vehicle velocity $v_{GND}$ of the vehicle 100. The signals from the sensors 150, 160, 170 are passed to inputs of a drive control system 190. The signals 485, 495 from the drive control system 190 are passed to the actuators 480, 490.

Figure 2:
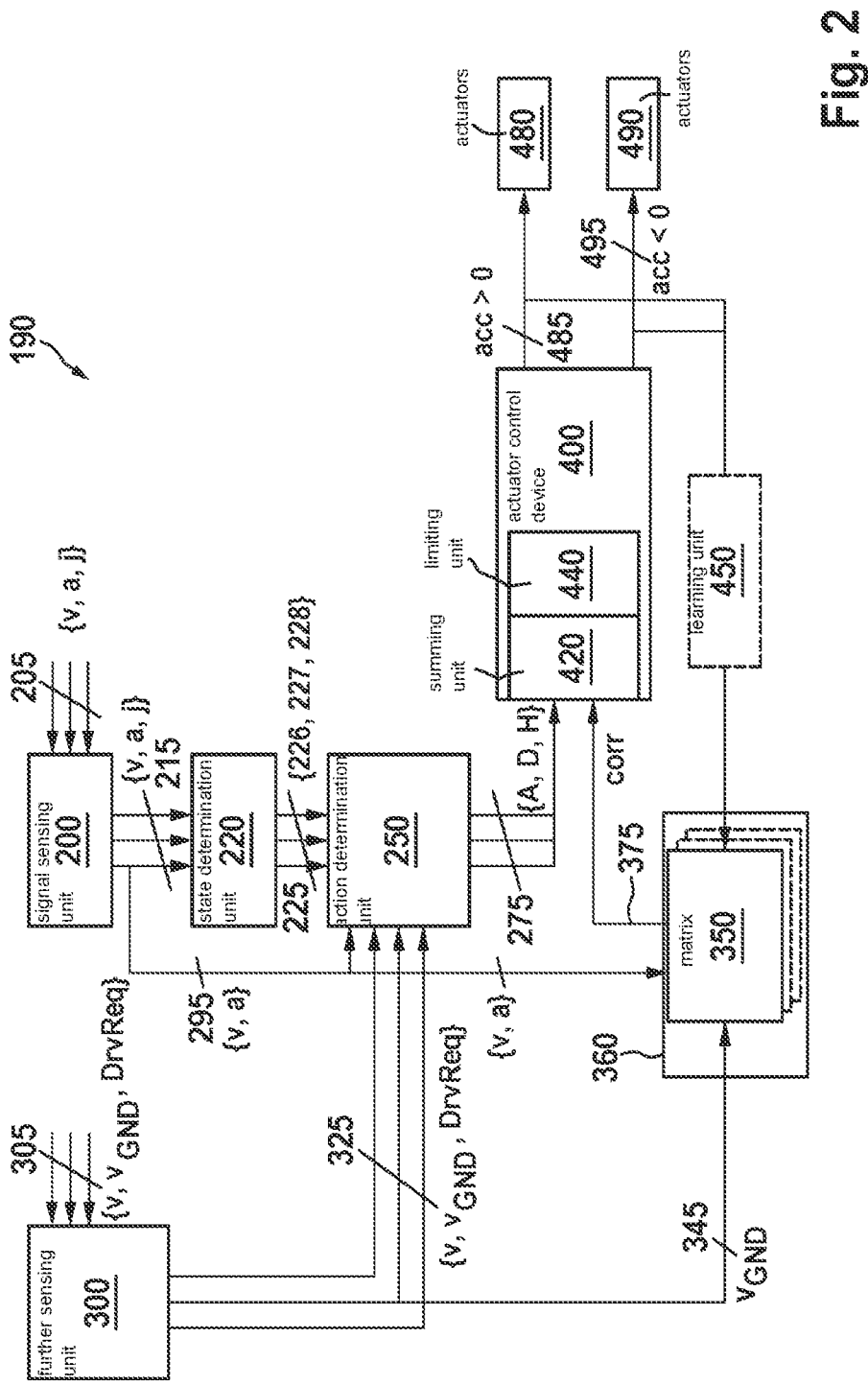
FIG. 2 shows a schematic illustration of a drive control system according to one embodiment of the present invention.

FIG. 2 schematically shows details of the drive control system 190 of FIG. 1. Identical reference signs denote identical or similar components. A signal sensing unit 200 configured to sense a wheel velocity v of the wheel 120 and, optionally, to sense a wheel acceleration a and/or a wheel dynamic j, receives, from the sensors 150 for each of the wheels 120, signals 205 of the wheel velocity v of each wheel 120 and, optionally, signals of the wheel acceleration a and/or of the wheel dynamic j. If the signals a and j are not provided by the sensors 150, these signals can be formed, for example by the signal sensing unit 200. The signals v, a, j 215 are passed to a state determination unit 220 which is configured to determine a status description 225 of the wheel or of each wheel 120, from v and a, optionally also from j.

The signals 305 from the sensors 150, 160, 170 are passed to a further sensing unit 300 which is configured to sense the desired acceleration DrvReq (from the sensor 160) and a vehicle velocity $v_{GND}$ (from the sensor 170) of the vehicle 100. A slip s can be formed by the sensing unit 300 and/or by downstream components. The slip s can be formed for each of the wheels 120 as a function of the wheel velocity v and the vehicle velocity $v_{GND}$. An action determination unit 250 determines a first value 275 of a target wheel acceleration from the status description 225, the slip s of the wheel 120 and the desired acceleration DrvReq. For example, the first value 275 can be selected from a set { accelerate, decelerate, maintain} or can comprise this set. A correction unit 360 determines a second value 375 of the target wheel acceleration from the wheel velocity v, the wheel acceleration a, and the slip s. The correction unit 360 comprises at least one matrix 350, which contains correction factors. The correction factors of the at least one matrix 350 can, for example, be sorted by ascending slip s and by ascending wheel acceleration a. "Gaps" (e.g., if an entry in the matrix 350 for a particular slip s and/or for a particular wheel acceleration a does not exist) in the matrix 350 can be "filled" by means of interpolation, for example.

The output signals 275, 375 of the action determination unit 250 and of the correction unit 360 are passed to an actuator control device 400. A summing unit 420 can sum the values of the output signals 275, 375 and/or form, for each wheel 120, a signal which is a function of the output signals 275, 375. A limiting unit 440 can limit the output signals of the summing unit 420, e.g., by means of a functional and/or plausibility check. The algorithms of these checks can, for example, take into account a maximum output of the powertrain 480 and/or of the brakes 490, 140. The algorithms of these checks can, for example, take into account functional relationships of the wheels 120, e.g., (mechanical and/or electronic) differentials. The output signals 485, 495 of the actuator control device 400 are passed to the powertrain 480 or the brakes 490, 140.

The drive control system 190 can optionally comprise a learning unit 450. In this case, the learning unit 450 can acquire one or more third values 485, 495 for at least one situation. The situation can comprise the wheel velocity v, the wheel acceleration a and, optionally, the wheel dynamic j. The learning unit 450 can compare the third value 485, 495 to the corresponding correction factor of the at least one matrix 350. Furthermore, if the slip s is lower when using the third value 485, 495 than when using the corresponding correction factor of the at least one matrix 350, an update of the third value 485, 495 can be entered into the corresponding element of the at least one matrix 350. This allows the learning unit 450 to learn from the "practice" of the drive control of this vehicle 100 and to thus improve the control system. Alternatively, or additionally, further options for updating the one matrix 350 can be implemented.

The components of the drive control system 190 can be realized as hardware, software, and/or from a combination of hardware and software. The components can be distributed spatially or realized in a single control device.

Figure 3:
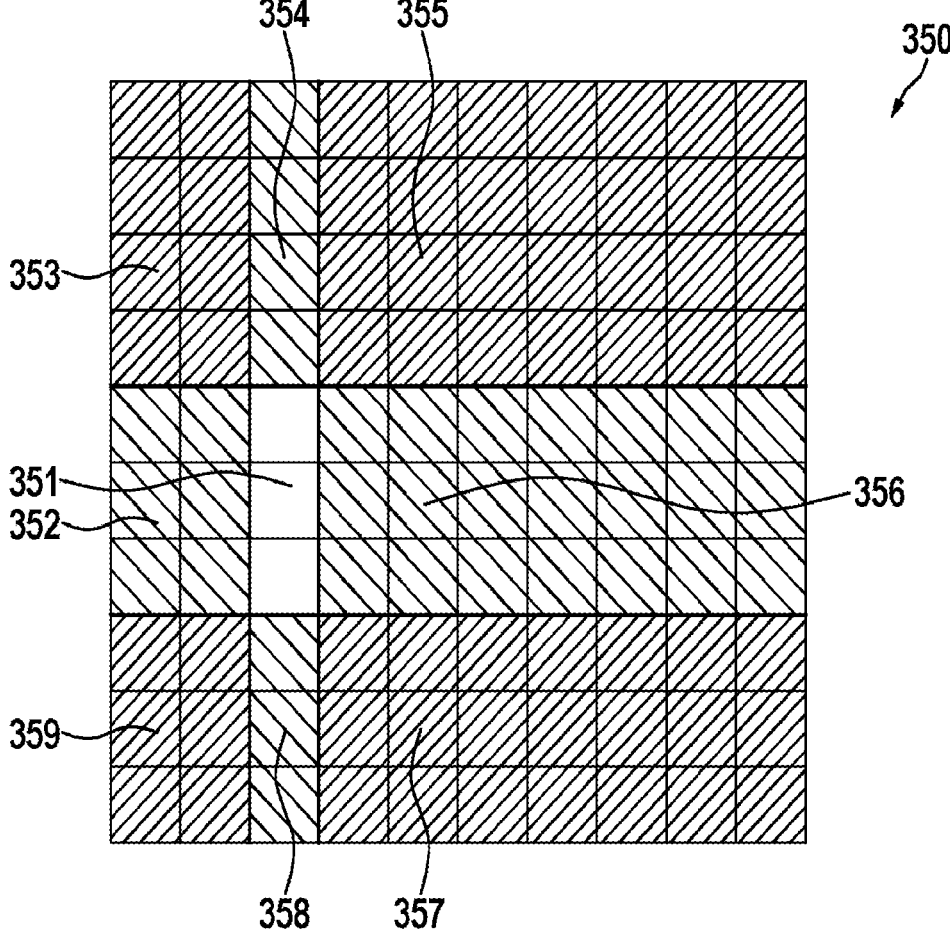
FIG. 3 shows a schematic illustration of a matrix according to one embodiment of the present invention.

FIG. 3 schematically shows a matrix 350 according to one embodiment. The elements of the matrix 350 comprise correction factors that can contribute to forming the third value 375 for a respective wheel 120. The correction factors of the at least one matrix 350 are sorted by ascending slip s (e.g., horizontally) and by ascending wheel acceleration a (e.g., vertically). The matrix 350 can have a first region 351 whose elements have a correction factor of zero. The further regions of the matrix 350 can, for example, be characterized as follows:

Region 352: slip s is lower, wheel acceleration is about zero;

Region 353: slip s is lower, wheel acceleration is greater;

Region 354: slip s is about zero, wheel acceleration is greater;

Region 355: slip s is greater, wheel acceleration is greater;

Region 356: slip s is greater, wheel acceleration is about zero;

Region 357: slip S is greater, wheel acceleration is lower;

Region 358: slip s is about zero, wheel acceleration is lower;

Region 359: slip s is lower, wheel acceleration is lower.

The elements of the matrix can have an equidistant distance of the slip values and/or wheel acceleration values and/or other distance functions. Correction factors "between" the elements can be interpolatable.

Figure 4:
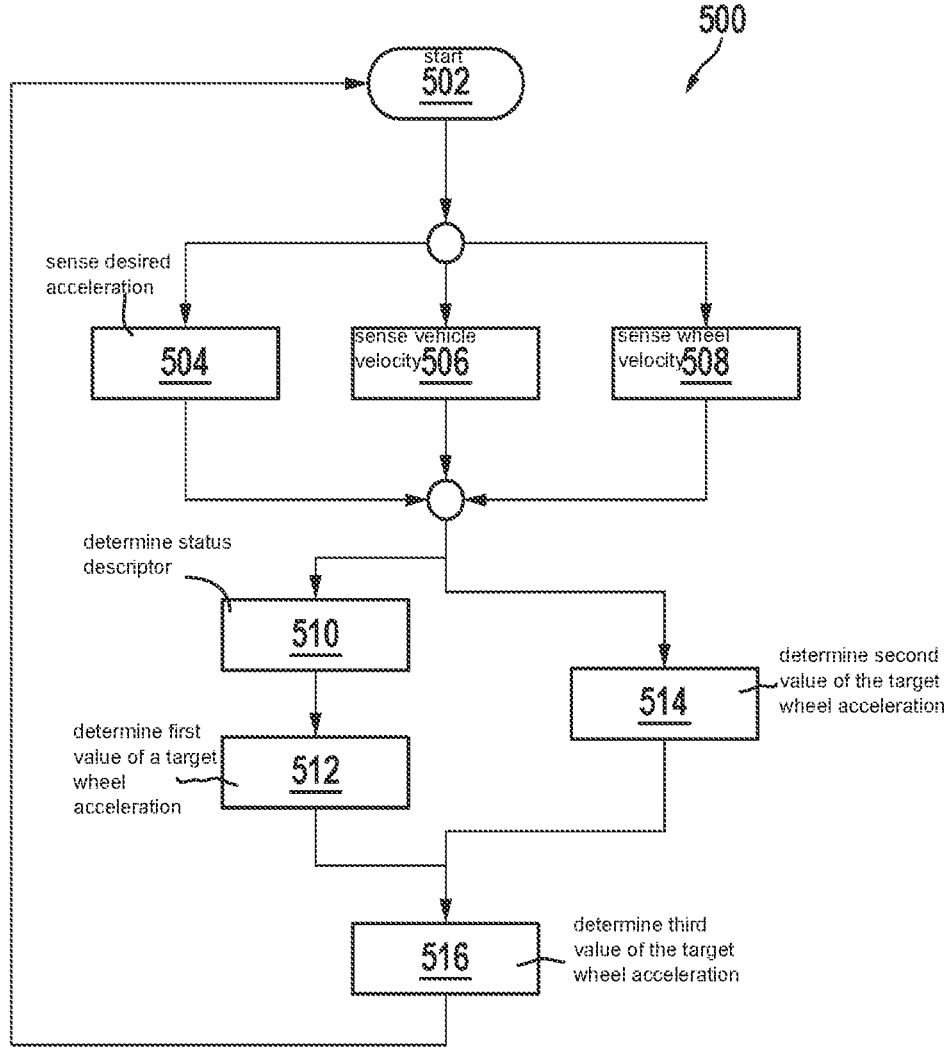
FIG. 4 shows a flowchart according to one embodiment of the present invention.

FIG. 4 shows a flowchart 500 according to one embodiment. The method starts in a step 502. In a step 504, a desired acceleration DrvReq (see FIG. 2) is sensed. In a step 506, a vehicle velocity $v_{GND}$ of the vehicle 100 is sensed. In a step 508, a wheel velocity v of the wheel 120 is sensed. Steps 504, 506, 508 can be performed substantially in parallel.

In a step 510, a status description 225 of the wheel 120 is determined from the wheel velocity v and a wheel acceleration a. The status description 225 comprises a static description 226 which is a function of the wheel velocity v and the wheel acceleration a. In a step 512, a first value 275 of a target wheel acceleration is determined from the status description 225, a slip s of the wheel 120 and the desired acceleration DrvReq. Here, the slip s is a function of the wheel velocity v and the vehicle velocity $v_{GND}$. In a step 514, a second value 375 of the target wheel acceleration is determined from the wheel velocity v, the wheel acceleration a and the slip s, wherein the second value is a function of correction factors of at least one matrix 350. Steps 510, 512 and step 514 can be performed substantially in parallel.

In a step 516, a third value 585, 595 of the target wheel acceleration is determined, which value controls the actuators 580, 590 of the at least one wheel 120, wherein the third value 585, 595 is a function of the first value 275 and of the second value 375. Steps 502 to 516 can be repeated regularly, e.g., periodically, e.g., every 1 ms, 2 ms, 5 ms, and/or with another periodicity or cycle time.

The invention claimed is:

1. A method for a drive control of actuators of at least one wheel of a vehicle, comprising the following steps:

sensing a desired acceleration;

sensing a vehicle velocity of the vehicle;

sensing a wheel velocity of the wheel;

determining a status description of the wheel from the wheel velocity and a wheel acceleration, wherein the status description includes a static description which is a function of the wheel velocity and of the wheel acceleration;

determining a first value of a target wheel acceleration from the status description, a slip of the wheel, and the desired acceleration, wherein the slip is a function of the wheel velocity and the vehicle velocity;

determining a second value of the target wheel acceleration from the wheel velocity, the wheel acceleration, and the slip, wherein the second value is a function of correction factors of at least one matrix; and determining a third value of the target wheel acceleration, the third value controlling the actuators of the at least one wheel, wherein the third value is a function of the first value and of the second value.

2. The method according to claim 1, wherein the status description of the wheel further includes a dynamic description which is a function of the wheel acceleration and a wheel dynamic.

3. The method according to claim 2, wherein the status description of the wheel further includes a predictive description which is a function of the wheel dynamic.

4. The method according to claim 1, wherein the correction factors of the at least one matrix are sorted by ascending slip and by ascending wheel acceleration, and wherein the at least one matrix includes a first region whose elements have a correction factor of zero.

5. The method according to claim 1, wherein the third value of the target wheel acceleration is a function of a sum of the first value and the second value.

6. The method according to claim 5, wherein the third value is a function of limiting the sum of the first value and the second value.

7. A method for a drive control of actuators of at least one wheel of a vehicle, comprising the following steps:

sensing a desired acceleration;

sensing a vehicle velocity of the vehicle;

sensing a wheel velocity of the wheel;

determining a status description of the wheel from the wheel velocity and a wheel acceleration, wherein the status description includes a static description which is a function of the wheel velocity and of the wheel acceleration;

determining a first value of a target wheel acceleration from the status description, a slip of the wheel, and the desired acceleration, wherein the slip is a function of the wheel velocity and the vehicle velocity;

determining a second value of the target wheel acceleration from the wheel velocity, the wheel acceleration, and the slip, wherein the second value is a function of correction factors of at least one matrix;

determining a third value of the target wheel acceleration, the third value controlling the actuators of the at least one wheel, wherein the third value is a function of the first value and of the second value;

sensing the third value of the target wheel acceleration for at least one situation, wherein the situation includes the wheel velocity, the wheel acceleration, and a wheel dynamic;

comparing the third value to a corresponding correction factor of the at least one matrix; and entering an update of the third value into a corresponding element of the at least one matrix when the slip is lower when using the third value than when using the corresponding correction factor of the at least one matrix.

8. A drive control system for a drive control of actuators of at least one wheel of a vehicle, the drive control system comprising:

a signal sensor configured to sense a wheel velocity of the wheel and to sense a wheel acceleration and/or a wheel dynamic;

a further sensor configured to sense a desired acceleration and a vehicle velocity of the vehicle;

a state determinator configured to determine a status description of the wheel from the wheel velocity and the wheel acceleration;

an action determinator configured to determine a first value of a target wheel acceleration from the status description, a slip of the wheel, and the desired acceleration, wherein the slip is a function of the wheel velocity and the vehicle velocity;

a corrector including at least one matrix which contains correction factors and configured to determine a second value of the target wheel acceleration; and an actuator controller configured to control the actuators of the at least one wheel based on an operation of the first value with the second value.

9. A vehicle, comprising:

a drive control system for a drive control of actuators of at least one wheel of the vehicle, the drive control system including:

a signal sensor configured to sense a wheel velocity of the wheel and to sense a wheel acceleration and/or a wheel dynamic, a further sensor configured to sense a desired acceleration and a vehicle velocity of the vehicle, a state determinator configured to determine a status description of the wheel from the wheel velocity and the wheel acceleration, an action determinator configured to determine a first value of a target wheel acceleration from the status description, a slip of the wheel, and the desired acceleration, wherein the slip is a function of the wheel velocity and the vehicle velocity, a corrector including at least one matrix which contains correction factors and configured to determine a second value of the target wheel acceleration, and an actuator controller configured to control the actuators of the at least one wheel based on an operation of the first value with the second value.

10. A non-transitory computer-readable medium on which is stored a program element for a drive control of actuators of at least one wheel of a vehicle, the program element, when executed on a drive control system, causing the drive control system to perform the following steps:

sensing a desired acceleration;

sensing a vehicle velocity of the vehicle;

sensing a wheel velocity of the wheel;

determining a status description of the wheel from the wheel velocity and a wheel acceleration, wherein the status description includes a static description which is a function of the wheel velocity and of the wheel acceleration;

determining a first value of a target wheel acceleration from the status description, a slip of the wheel, and the desired acceleration, wherein the slip is a function of the wheel velocity and the vehicle velocity;

determining a second value of the target wheel acceleration from the wheel velocity, the wheel acceleration, and the slip, wherein the second value is a function of correction factors of at least one matrix; and determining a third value of the target wheel acceleration, the third value controlling the actuators of the at least one wheel, wherein the third value is a function of the first value and of the second value.

* * * * *